United States Patent
Chelaidite et al.

(10) Patent No.: US 10,903,715 B2
(45) Date of Patent: Jan. 26, 2021

(54) MOTOR ASSEMBLY

(71) Applicant: AKEBONO BRAKE INDUSTRY CO., LTD., Tokyo (JP)

(72) Inventors: Galus Chelaidite, South Lyon, MI (US); Brian Lewis Boyle, Farmington Hills, MI (US); Carla Thomas, Royal Oak, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 268 days.

(21) Appl. No.: 15/909,031

(22) Filed: Mar. 1, 2018

(65) Prior Publication Data

US 2018/0316240 A1 Nov. 1, 2018

Related U.S. Application Data

(60) Provisional application No. 62/492,377, filed on May 1, 2017.

(51) Int. Cl.
| | |
|---|---|
| *H02K 5/22* | (2006.01) |
| *F16D 55/225* | (2006.01) |
| *F16D 51/20* | (2006.01) |
| *F16D 65/18* | (2006.01) |

(Continued)

(52) U.S. Cl.
CPC ............... *H02K 5/22* (2013.01); *F16D 51/20* (2013.01); *F16D 55/225* (2013.01); *F16D 65/18* (2013.01);

(Continued)

(58) Field of Classification Search
CPC ........ F16D 55/225; F16D 51/20; F16D 65/18; F16D 65/22; F16D 2121/24; H02K 5/22;
(Continued)

(56) References Cited

U.S. PATENT DOCUMENTS

| | | |
|---|---|---|
| 3,667,578 A | 6/1972 | Johnson |
| 4,888,509 A | 12/1989 | Tomasek |

(Continued)

FOREIGN PATENT DOCUMENTS

EP 0731277 A1 9/1996

OTHER PUBLICATIONS

Extended European Search Report for European Application No. 18169701.2, dated Jul. 30, 2018.

*Primary Examiner* — Melody M Burch
(74) *Attorney, Agent, or Firm* — The Dobrusin Law Firm, P.C.; Bryan S. Lemanski

(57) ABSTRACT

An assembly that includes a main housing. A motor is supported in a motor housing that is supported in the main housing. The motor has an output shaft and a locking mechanism. The motor is adapted to generate a first rotational direction torque and a second rotational direction torque. The motor is adapted to transfer the first rotational direction torque and the second rotational direction torque to a destination via the output shaft. The locking mechanism is adapted to prevent the output shaft from back driving in the second rotational direction after the first rotational direction torque has been transferred to the destination. The motor housing is adapted to rotate in the main housing to unlock the locking mechanism so that the second rotational direction torque can be transferred to the destination.

17 Claims, 8 Drawing Sheets

(51) Int. Cl.
  *H02K 7/10* (2006.01)
  *F16D 65/22* (2006.01)
  *H02K 7/102* (2006.01)
  *B60T 1/00* (2006.01)
  *F16D 121/24* (2012.01)
  *B60T 1/06* (2006.01)

(52) U.S. Cl.
  CPC ............... *F16D 65/22* (2013.01); *H02K 7/10* (2013.01); *H02K 7/102* (2013.01); *B60T 1/065* (2013.01); *B60T 1/067* (2013.01); *F16D 2121/24* (2013.01)

(58) Field of Classification Search
  CPC .......... H02K 7/10; H02K 7/102; B60T 1/065; B60T 1/067
  See application file for complete search history.

(56) References Cited

U.S. PATENT DOCUMENTS

| | | | |
|---|---|---|---|
| 5,931,268 A * | 8/1999 | Kingston | F16D 65/0006 188/158 |
| 6,109,122 A | 8/2000 | Bori et al. | |
| 6,230,492 B1 * | 5/2001 | Kingston | B60T 13/745 60/545 |
| 6,814,209 B1 * | 11/2004 | Acosta | H02K 7/102 192/223.2 |
| 8,618,705 B2 | 12/2013 | Wolf et al. | |
| 2001/0027146 A1 * | 10/2001 | Spaziani | F16H 37/065 477/3 |
| 2008/0290746 A1 | 11/2008 | Strueber | |
| 2014/0027221 A1 * | 1/2014 | Akada | F16D 65/22 188/325 |

* cited by examiner

MOTOR ASSEMBLY

FIELD

These teachings relate to a motor assembly that includes a locking mechanism.

BACKGROUND

Electric motors are used in a variety of applications to power items such as fans, blowers, pumps, machine tools, household appliances, power tools, and the like. Electric motors are also used in a variety of brake assemblies to create a clamping force to slow, stop, or prevent movement of a moveable component. Brake assemblies may be found in, for example, a lathe, winder for paper products or cloth, amusement park rides, wind turbines, vehicles, or the like.

In certain applications, one or more low-efficiency mechanisms may be provided between the motor output and the item or the brake assembly to convert an output torque from the motor to a linear force. While these low-efficiency mechanisms are desirable because they may prevent back-driving of the motor after the clamping force is created and the motor is turned OFF (i.e., the friction within the low-efficiency mechanisms may prevent an opposing or reaction torque from unwinding or releasing the clamping force), a larger motor or more torque may be required to overcome the friction and move the low-efficiency mechanisms to create the clamping force. Exemplary motor assemblies are disclosed in U.S. Pat. Nos. 6,109,122 and 4,888,509, the disclosures of which are hereby incorporated by reference herein for all purposes.

It may thus be desirable to replace the low-efficiency mechanism with a high-efficiency mechanism so that a smaller motor or a motor producing less torque can be used. However, a high-efficiency device may not prevent back-driving of the motor after the clamping force has been created and the motor is turned OFF because the opposing reaction torque may overcome the low friction of the high-efficiency mechanism. Therefore, to use a high-efficiency mechanism, additional features may be required in the motor assembly or between the item and the motor assembly to prevent such back driving. These other, additional features to prevent the back driving may undesirably add cost, weight, and/or complexity to the system.

A need for improvement in the art may be desirable. For example, it may be desirable to have a motor assembly that includes a locking mechanism that can prevent back driving of the motor when the motor is turned OFF or not powered. For example, it may be desirable to have a motor assembly that includes a locking mechanism that can prevent back driving of the motor after a clamping force has been developed in a brake assembly and power to the motor assembly has been turned OFF or discontinued.

SUMMARY

These teachings provide a motor assembly that includes a locking mechanism that can prevent back driving of the motor. The locking mechanism can advantageously prevent back driving of the motor after the motor has been turned OFF or power to the motor ceases to be provided or has been discontinued. These teachings provide a motor assembly that includes a locking mechanism that can prevent back driving of the motor after a clamping force has been created in a brake assembly. Advantageously, one or more high efficiency mechanisms can be provided between the motor output and the destination so that the torque from the motor can be transferred with high efficiency. After the torque has been transferred and the motor is turned OFF or power to the motor ceases to be provided or is discontinued, the locking mechanism may function to prevent back-driving of the motor and thus release any generated torque or clamping force. Then, when the motor is turned ON, the motor may function to unlock the locking mechanism so that torque can be transferred from the motor output to an item or destination.

These teachings relate to an assembly that includes a motor supported in a housing. The motor is adapted to generate and transfer a first rotational direction torque to a destination. The assembly includes a locking mechanism to prevent back driving of the motor after the first rotational direction torque has been transfer to the destination. The motor is adapted to rotate in the housing to unlock the locking feature so that the motor can transfer an opposing, second rotational direction torque to the destination.

These teachings relate to an assembly that includes an electric motor that is supported axially in a main housing, but is allowed to, and/or is free to, and/or is adapted to rotate in the main housing. After a signal, voltage, or current is supplied to the motor or the motor assembly, the motor is adapted to generate a first rotational direction torque output via the motor shaft. The motor shaft is configured to or is adapted to be in communication with a destination, such as a gear train, so that the generated first rotational direction torque can be transferred to the destination. The first rotational direction torque induces an equal and opposite second rotational direction torque in the motor housing. The assembly includes a locking mechanism to prevent back driving of the output shaft and/or motor after the signal, voltage, or current ceases to be provided to the motor and/or after the motor is turned OFF or disabled. After another signal, voltage, or current is provided to the motor, the motor housing is adapted to rotate in the main housing, while the motor housing is free from rotating, to unlock the locking feature so that the motor can then generate and transfer an opposing second first rotational direction torque to the destination.

These teachings may find use in a variety of applications including any application where a motor is used to rotate an object. For example, these teachings may find use in brake system to move one or more brake pistons and/or brake pads and/or brake shoes to create a clamping force.

DETAILED DESCRIPTION

Figure 1:
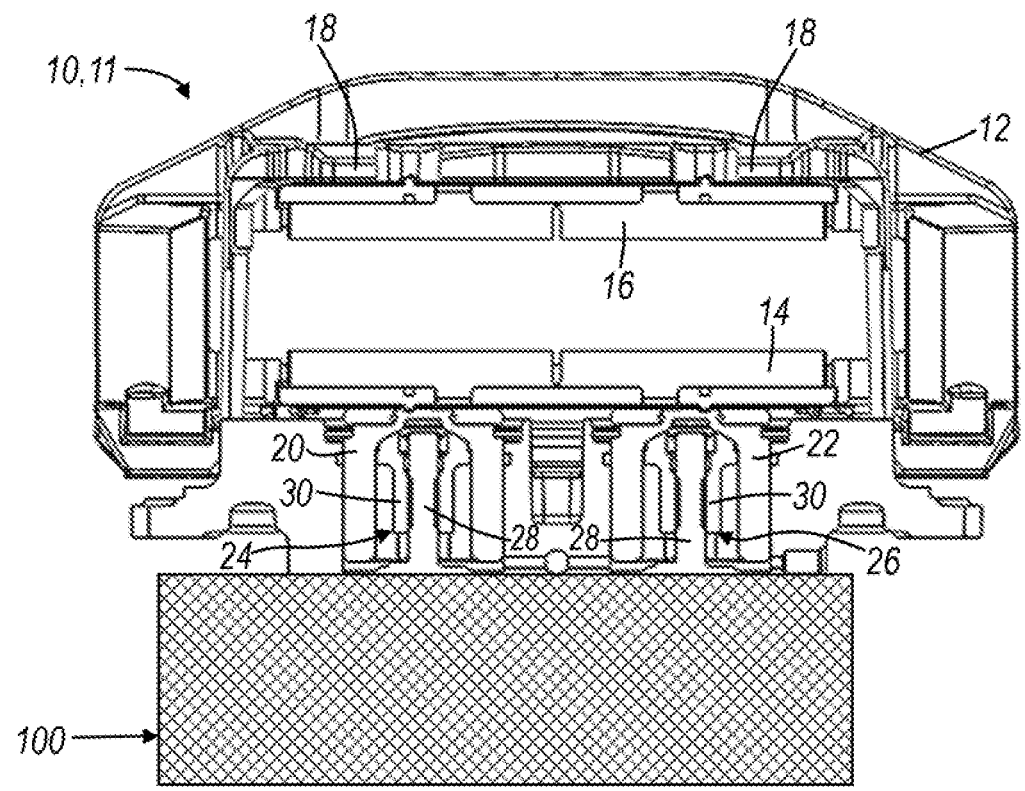
FIG. 1 is a cross-sectional view of a brake assembly.

This application claims the benefit of U.S. No. 62/492,377 filed on May 1, 2017, the entire disclosure of which is hereby incorporated by reference herein for all purposes.

Generally, these teachings relate to a motor assembly. The motor assembly includes a motor that is supported, or mounted in a motor housing and the motor housing is supported, or mounted in a main housing. The motor is adapted to generate and transfer a first rotational direction torque to an output or destination via the motor shaft. The motor assembly includes a locking mechanism to prevent back driving of the motor after the first rotational direction torque has been transferred to the output or destination and the motor has been turned OFF or power ceases to be provided to the motor. The motor housing is adapted to rotate in the main housing to unlock the locking feature so that an opposing, second rotational direction torque can be generated and transferred to the output or destination. When the motor is turned OFF, and/or when the motor is disabled and/or when power ceases to be provided to the motor, the locking mechanism is engaged, which means that the motor is locked and the motor output is prevented from rotating. When the motor is turned ON and/or power is provided to the motor, and/or when the motor is enabled, the locking mechanism is disengaged, meaning the motor output may rotate.

The motor assembly can be used in combination with any brake assembly. For example, the motor assembly can be used with or incorporated into a disc brake system or a drum brake system. However, it is understood that the motor assembly is not limited for use in only brake systems. For example, any destination or assembly where a motor is used can benefit from the features of the motor assembly described herein because of its advantageous abilities to generate and transfer a first direction torque; maintain the torque at the destination after the motor is turned OFF or power ceases to be provided to the motor or the motor is disabled; and then generate and transfer a second direction torque to the destination after the motor is turned ON or power is provided to the motor.

The teachings herein provide a brake system. The brake system may be any system or assembly for creating a clamping force. The brake system may function to create a clamping force and/or a brake apply to slow, stop, and/or maintain a road wheel or a vehicle in a stopped position. The brake system may function to release a clamping force and/or a brake apply so that a road wheel or a vehicle can move. For example, the brake system may be an opposing brake system (i.e., a fixed caliper brake system) or a floating brake system (i.e., a floating caliper). The brake system may be a disc brake system. The brake system may be a drum brake system (i.e., a drum-in-hat brake system). The brake system may be a combined disc brake system and a drum brake system. The brake system may be a service brake system. The brake system may be a parking brake system.

Clamping force may be any force that, when coupled with a brake pad or brake shoe coefficient of friction, functions to decelerate, slow, stop, and/or prevent movement or rotation of a brake rotor, a brake drum, a road wheel, and/or a vehicle. The clamping force may be created during a standard brake apply or application of the service brake (i.e., a brake apply force) to slow, stop, or prevent movement of a road wheel or vehicle. The clamping force may be created during a parking brake apply (i.e., a parking brake force) to prevent or restrict movement of a stopped or parked road wheel or vehicle.

The brake system may comprise a brake caliper that works in conjunction with a brake rotor, or brake disc. The brake caliper may function to support one or more the components of the brake system, one or more the components of the parking brake system, or both. For example, the brake caliper may comprise one or more supports configured to engage and/or support the one or more brake pads. The brake caliper may provide for one or more brake pads, or, preferably, two or more brake pads to move relative to the brake rotor. The brake caliper may move during a brake apply (i.e., a floating caliper), or the brake caliper may be fixed so that the brake caliper does not move during a brake apply (i.e., a fixed caliper). The brake caliper may be connected or mounted to any non-rotating or moving part of a vehicle, like a knuckle or a spider, which may be the casting that a disc brake or drum-in-hat system is mounted to.

The brake caliper may comprise one or more piston bores. A piston bore may define a hollow region in the brake caliper that is configured to receive and support a corresponding brake piston. A brake caliper can have one piston bore. A brake caliper can have two or more piston bores. One or more piston bore(s) can be located on only one side of the brake rotor, or one or more piston bores can be located on both sides of the brake rotor.

The brake system may include one or more brake pistons. The one or more brake pistons may function to move a brake pad, or a corresponding end of brake pad, towards a brake rotor to create the clamping force. The one or more brake pistons can be moved by pressurizing or depressurizing fluid, such as brake fluid. The one or more brake pistons can be moved with mechanisms, such as with one or more rotary to linear state mechanisms; spindles; nuts; etc.

Each brake piston may include a brake piston pocket. The brake piston pocket may be a cup or recess formed into an end of a brake piston. The brake piston pocket may include a bottom wall at the end or bottom of the brake piston pocket and an opposing open end. The brake piston pocket may receive at least a portion of a corresponding rotary to linear stage mechanism. A gap may exist between the nut of the rotary to linear stage mechanism and a corresponding bottom wall. During a brake apply, whether during application of the service brake or the parking brake, the gap may be taken up by moving the rotary to linear stage mechanism towards the bottom wall. Once the gap is taken up, further movement of the nut or rotary to linear stage mechanism may cause the nut to press against the bottom wall and then move the brake piston and thus brake pad against the brake rotor to create the clamping force.

Brake pads are used in a disc brake system. The brake system may include one or more brake pads. Each brake pad includes a friction material and a pressure plate. The one or more brake pads may be supported on the brake caliper so that the friction material faces a side of the brake rotor. The pressure plate may oppose the friction surface. One or more brake pistons, or one or more brake caliper fingers, may contact the pressure plate of a corresponding brake pad. For example, in some cases, one or more brake pistons may be in contact with the pressure plate of an inboard brake pad, and one or more brake caliper fingers may be in contact with the pressure plate of an outboard brake pad. In some cases, one or more brake pistons may be in contact with the pressure place of an inboard brake pad, and one or more brake pistons may be in contact with the pressure place of an outboard brake piston. During a brake apply, or while applying the parking brake, the one or more brake pistons and/or the one or more fingers can move all or an end of a corresponding brake pad so that the corresponding friction material engages a corresponding side of the brake rotor to create the clamping force.

Brake shoes are used in a drum-in-hat brake systems. The brake system may include one or more brake shoes. Each brake pad includes a friction material. The one or more brake shoes may be supported on the backing plate so that the friction material faces an inner surface of the brake drum. One or more brake pistons or the expanding mechanism may move the one or more brake shoes, or ends of the one or more brake shoes radially outward against the inner surface of the brake drum to create the clamping force.

The one or more rotary to linear stage mechanisms may function to transfer or convert a torque output from the motor assembly into a linear or axial force to move one or more items, such as the one or more brake pistons to create the clamping force. The one or more rotary to linear stage mechanisms may be a high-efficiency device, such as a ball screw or a roller screw for example. However, the one or more rotary to linear stage mechanisms may be a low-efficiency device.

Each of the one or more rotary to linear stage mechanisms may generally include a spindle and a nut.

The spindle may be rotated by the output of the motor, the motor assembly, the output of the motor gear, or any gear, gear train, or intermediate mechanism disposed between the motor and the spindle. The spindle may be rotated in an apply direction and a release direction to apply and release the parking brake, respectively. The apply direction may correspond to the first rotational direction torque supplied by the motor assembly, and the release direction may correspond to the second rotational direction torque supplied by the motor assembly, or vice versa. The apply direction may be a clockwise direction, and the release direction may be a counter-clockwise direction, or vice versa.

The nut may be moved axially along the axis that the spindle rotates about. The nut and the spindle may be threadably engaged such that when the spindle is rotated by the motor assembly, the nut moves axially toward or away from a bottom wall of the piston pocket depending if the corresponding spindle is moved in an apply or release direction. After contact between the nut and the piston pocket wall is made, further movement of the nut in the apply direction may result in movement of a brake piston and thus a brake pad, or a corresponding end of a brake pad towards a brake rotor.

The motor assembly may comprise one or more motors. The motor may be any motor for creating a force or torque. For example, the motor may be a DC motor, a brushless motor, a series-wound, motor, a shunt wound motor, a compound wound motor, a separately exited motor, a servomotor, a stepping motor, or a permanent magnet motor. The motor may include one or more electrical leads for connecting the motor to a power source or a controller. Supplying power or one or more electrical signals to the motor from the power source or controller may cause the output shaft of the motor to rotate about an axis in an apply direction or release direction. The output shaft rotation may be adapted for an apply direction (to create a clamping force) and for a release direction (to release a clamping force). The motor may be located in or supported in a motor housing.

The motor housing is adapted to support the motor, including the stator, permanent magnets, commutator, etc. The motor housing may be adapted to rotate in a main housing, which is discussed further below. The motor housing may be adapted to rotate in the main housing about an axis that is the same as the axis about which the output shaft of the motor also rotates. The motor may be supported in the main housing so that the motor is restricted or prevented from axially moving about or along the axis about which the motor housing rotates to unlock the locking mechanism. The angular displacement of the motor housing relative to the main housing is predefined and restricted to the length of a slot in the main housing through which a pin extends. The slot and pin are described further below. The length of the slot can be virtually any length.

The motor housing is adapted to rotate in the main housing to release the locking mechanism. Rotation of the motor housing in the main housing may cause the locking mechanism to unlock or release its grip around the arbor diameter or output shaft of the motor.

The pin may be attached to or formed into the motor housing so the pin always rotates together with the motor housing. The pin may function to move a tang of the locking mechanism or wrap spring to release the locking mechanism so that the motor output or the motor shaft can rotate in a second direction so that the second direction torque can be generated and supplied to the destination or output. The pin may cooperate with a slot or other opening in the main housing or the stationary plate through which it passes or protrudes, to limit or restrict how much the motor housing can rotate in the main housing. That is, rotation of the motor housing in the main housing may be limited to the length of the slot, and after the pin contacts an end of the slot, prevents the motor housing from further rotating in the main housing.

The main housing may support the motor assembly. The main housing may be adapted to allow the motor housing to rotate in the main housing. The main housing may be restricted or prevented from moving or rotating, especially when the motor housing rotates within the main housing. The main housing may be a single, unitary piece, or the main housing may be fabricated from two or more components that are joined together with one or more fasteners.

The locking mechanism may function to prevent back driving of the motor. The locking mechanism may be any mechanism that may be locked and unlocked. For example, the locking mechanism may be a disc brake with ball ramps to engage and disengage the disc brake. The locking mechanism may be a wrap spring or coil spring. The locking mechanism may be a wrapped around an output shaft of the motor or an arbor diameter of the motor output. The wrap spring may be wrapped or wound in a counter-clockwise direction, which means that the locking mechanism will resist counter-clockwise rotation of the motor output or output shaft, but allow clockwise rotation of the motor output or output shaft. Alternatively, the wrap spring may be wrapped or wound in a clockwise direction, which means that the locking mechanism will resist clockwise rotation of the motor output or output shaft, but allow counter-clockwise rotation of the motor output or output shaft.

The stationary plate may be a feature or element that is located within the main housing. The stationary plate, or the features of the stationary plate may be integrally formed with the main housing. Thus, the stationary plate may be restricted or prevented from rotating or otherwise moving.

The stationary plate may include one or both of the openings through which one or both of the tangs of the wrap spring or locking mechanism extend.

FIG. 1 illustrates a brake assembly 10. The brake assembly 10 is a disc brake system 11. The brake assembly 10 comprises a brake caliper 12. The brake caliper 12 supports an inboard brake pad 14 and an outboard brake pad 16. The brake pads 14, 16 are arranged on opposing sides of the brake caliper 12 so that the friction material of each brake pad 14, 16 faces a side of a brake rotor. The brake caliper 12 also supports a first brake piston 20 and a second brake piston 22.

The brake assembly 10 comprises a first rotary to linear stage mechanism 24 that is in communication with the first brake piston 20, and a second rotary to linear stage mechanism 26 is in communication with the second brake piston 22. Each rotary to linear stage mechanism 24, 26 comprises a spindle 28 and a nut 30.

The brake assembly 10 comprises a motor assembly 100. The motor assembly 100 is adapted to generate and transfer torque to a destination, which in the case of this brake assembly 10 is to one or both of the rotary to linear stage mechanisms 24, 26. That is, the torque from the motor assembly 100 is transferred or supplied to one or both of the spindles 28, which causes one or both of the spindles 28 to rotate, which causes or results in axial movement of the corresponding nut 30 towards or away from a bottom pocket wall of the corresponding brake piston 20, 22.

During a brake apply, when the spindle 28 is rotated in an apply direction, the nut 30 is moved against the bottom pocket wall of the corresponding, brake piston 20, 22 so that the nut 30 pushes the corresponding the brake piston 20, 22 in a direction of the inboard brake pad 14, which then moves the corresponding end of the inboard brake pad 14 towards and eventually into contact with the brake rotor to create the clamping force. When the inboard brake pad 14 is moved against the brake rotor, fingers 18 pull the outboard brake pad 16 into contact with the opposing side of the brake rotor to create the clamping force. As will be discussed further below, after the clamping force has been created, and after the motor assembly 100 has been turned OFF or power ceases to be provided to the motor assembly 100, the motor assembly 100 is adapted to maintain the clamping force by preventing back driving of the motor assembly 100.

To release the clamping force, an opposing torque generated by the motor assembly 100 is supplied or transferred to one or both of the spindles 28, which causes the spindles to rotate in an opposing or release direction, which causes or results in the corresponding nut 30 to move away from the bottom pocket wall of the corresponding brake piston 20, 22 so that the brake pistons 20, 22 move away from the inboard brake pad 14, which thus allows the inboard brake pad 14 to move away from and out of contact with the brake rotor to release the clamping force.

Figure 2:
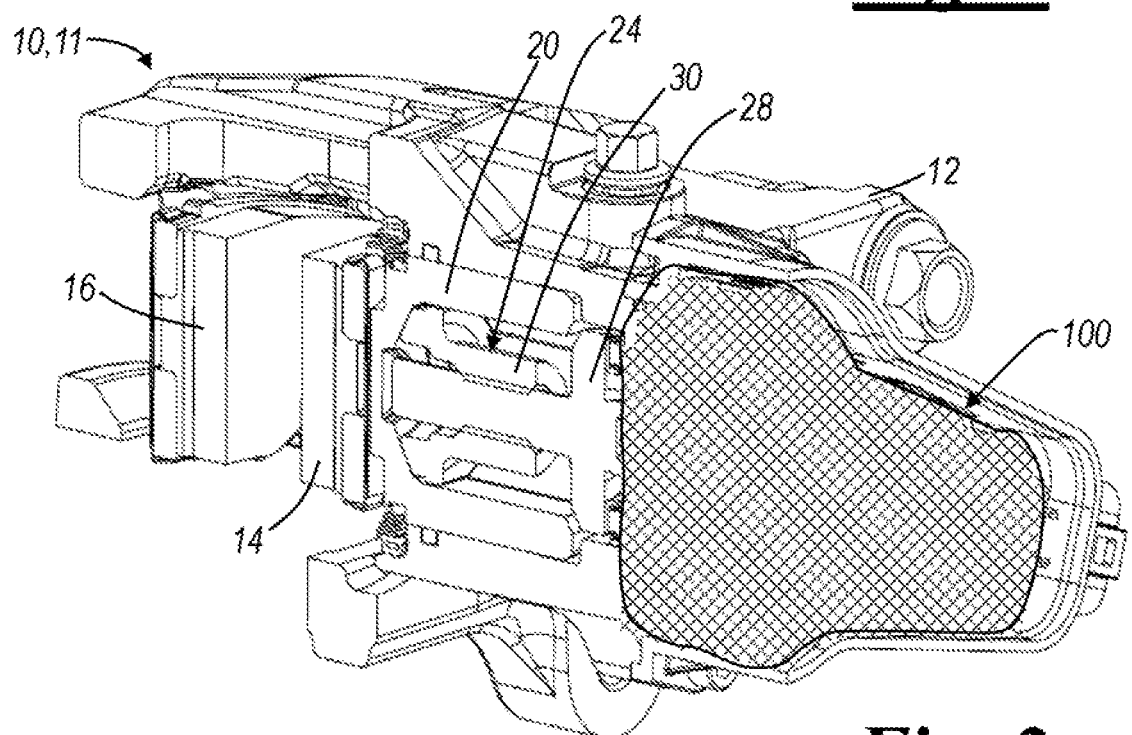
FIG. 2 is a cross-sectional view of another brake assembly.

FIG. 2 illustrates a brake assembly 10. The brake assembly 10 is a disc brake system 11. The brake assembly 10 comprises a brake caliper 12. The brake caliper 12 supports an inboard brake pad 14 and an outboard brake pad 16. The brake pads 14, 16 are arranged on opposing sides of the brake caliper 12 so that the friction material of each brake pad 14, 16 faces a side of a brake rotor. The brake caliper 12 also supports a brake piston 20.

The brake assembly 10 comprises a single rotary to linear stage mechanism 24 that is in communication with the first brake piston 20. The rotary to linear stage mechanism 24 comprises a spindle 28 and a nut 30.

The brake assembly 10 comprises a motor assembly 100. The motor assembly 100 is adapted to generate and transfer torque to a destination, which in the case of this assembly 10 is to the rotary to linear stage mechanism 24. That is, the torque from the motor assembly 100 is transferred or supplied to the spindle 28, which causes the spindles 28 to rotate, which causes or results in axial movement of the nut 30 towards or away from a bottom pocket wall of the brake piston 20. The steps for creating clamping force and releasing the clamping force with the brake assembly 10 of FIG. 2 is substantially the same as the steps for creating the clamping force and releasing the clamping force with the brake assembly 10 of FIG. 1 discussed above. As will be discussed further below, after the clamping force has been created, and after the motor assembly 100 has been turned OFF or power ceases to be provided to the motor assembly 100, the motor assembly 100 is adapted to maintain the clamping force by preventing back driving of the motor assembly 100.

Figure 3:
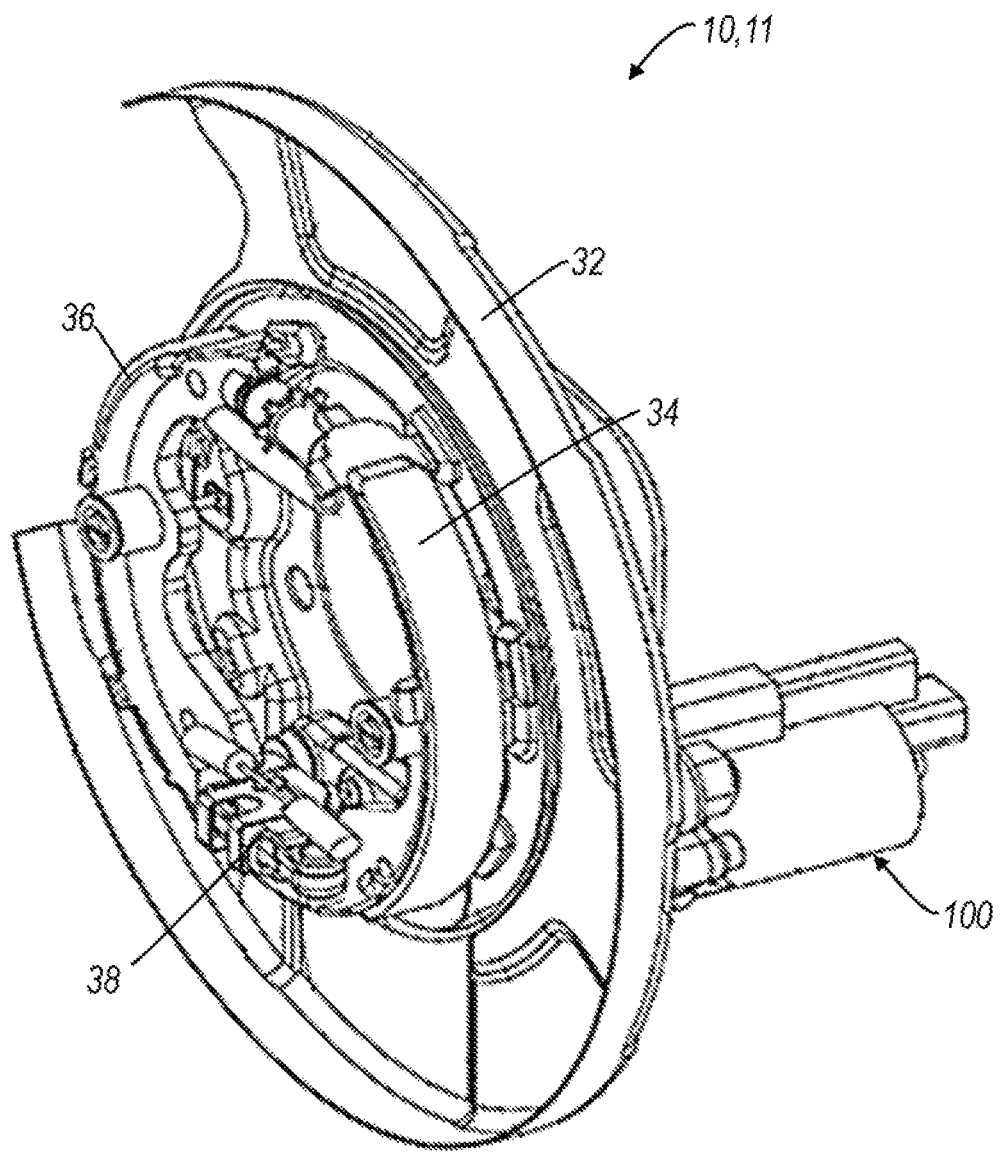
FIG. 3 is a perspective view of yet another brake assembly.

FIG. 3 illustrates a brake assembly 10. The brake assembly 10 is a drum brake system 11. The brake assembly comprises a backing plate 32 that supports a first brake shoe 34 and a second brake shoe 36. An expanding mechanism 38 is located between the brake shoes 34, 36. Movement of the expanding mechanism 38 causes the corresponding brake shoes 34, 36 to move towards or away from a brake drum to create or release the clamping force.

The brake assembly 10 comprises a motor assembly 100. The motor assembly 100 is adapted to generate and transfer torque to a destination, which in the case of this assembly 10 is to the expanding mechanism 38, which causes the mechanism 38 move the brake shoes 34, 36 towards or away from the brake drum to create or release the clamping force. As will be discussed further below, after the clamping force has been created, and after the motor assembly 100 has been turned OFF or power ceases to be provided to the motor assembly 100, the motor assembly 100 is adapted to maintain the generated clamping force by preventing back driving of the motor assembly 100.

FIGS. 4A-7 illustrate the motor assembly 100. The motor assembly 100 comprises a main housing 102. The main housing 102 includes a main body 103 and a cap 104 that are jointed together by at least one fastener 106. Located inside the main housing 102, the motor assembly 100 comprises a motor 108 that is contained in a motor housing 109; a rotation plate 110; a pair of bearings 112a, 112b, and an O-ring 114. A pin 116 is attached to the rotation plate 110. It is understood that the rotation plate 110 can be omitted. If the rotation plate 110 is omitted, then the pin 116 can be attached directly to the motor housing 109. However, if the motor assembly 100 includes the rotation plate 110, the rotation plate 100 may be thought of as being identical to, or the same as, the motor housing 109. Whether attached to the motor housing 109 or the rotation plate 110, the pin 116 extends through a slot 118 defined in the main housing 102. The slot 118 has a length that extends between a first end 120 and a second end 122.

The motor assembly 100 also comprises a locking mechanism 124 and a motor gear 126. Here the locking mechanism 124 is a wrap spring. The motor gear 126 is in communication with an output shaft 146 of the motor 108 so that rotation of the output shaft 146 causes the motor gear 126 to also rotate. The motor gear 126 comprises an arbor diameter 128 and an output 130. The locking mechanism 124 surrounds and grips a portion of the arbor diameter 128 with a slight interference fit. The locking mechanism 124 is wrapped or wound in a counter-clockwise direction, which means that the locking mechanism 124 will resist counter-clockwise rotation of the outputs 130, 146, but allow clockwise rotation of the outputs 130, 146. Torque generated by the motor assembly 100 is transferred or supplied to one or both of the rotary to linear stage mechanisms 24, 26 or the expansion mechanism 38 of the brake assemblies 10 described above via the output 130 of the motor gear 126 to create or release the clamping force.

Figure 4A:
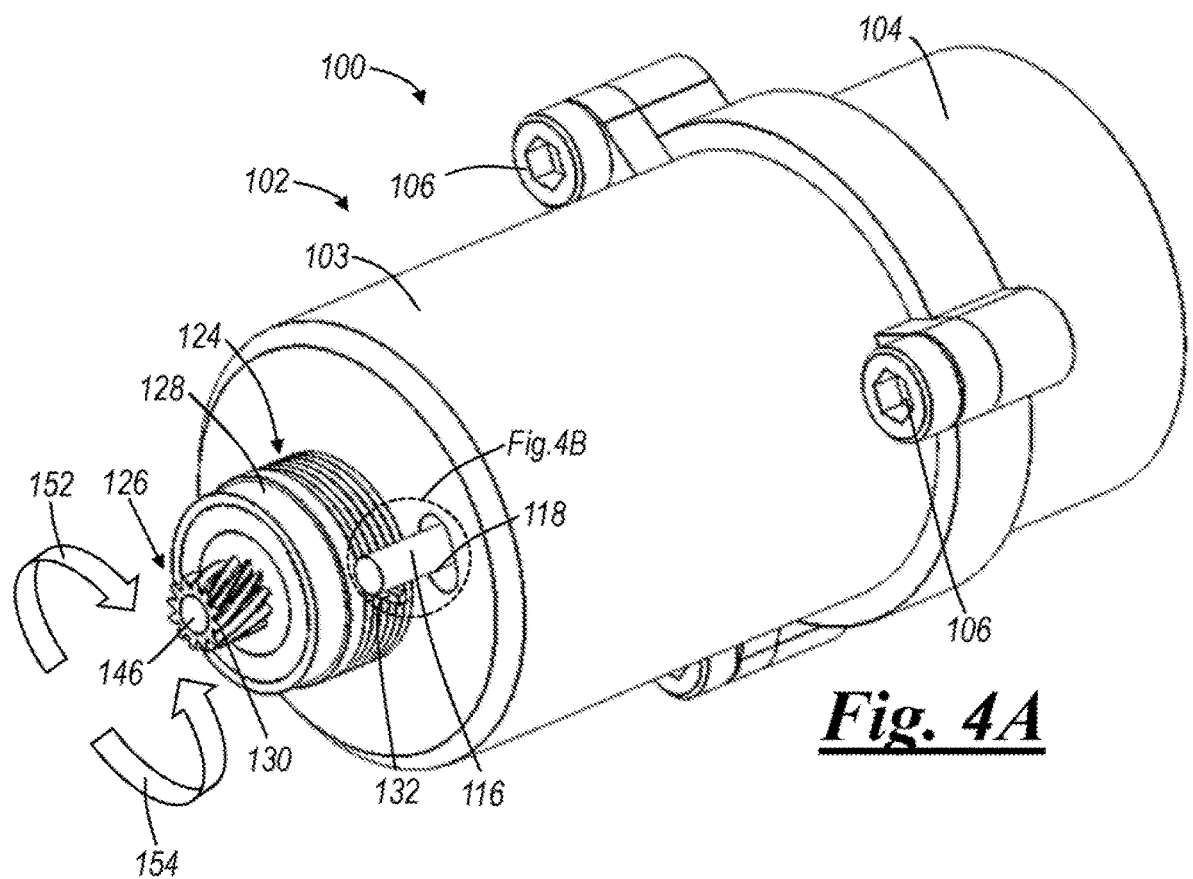
FIG. 4A is a perspective view of a motor assembly.
Figure 4B:
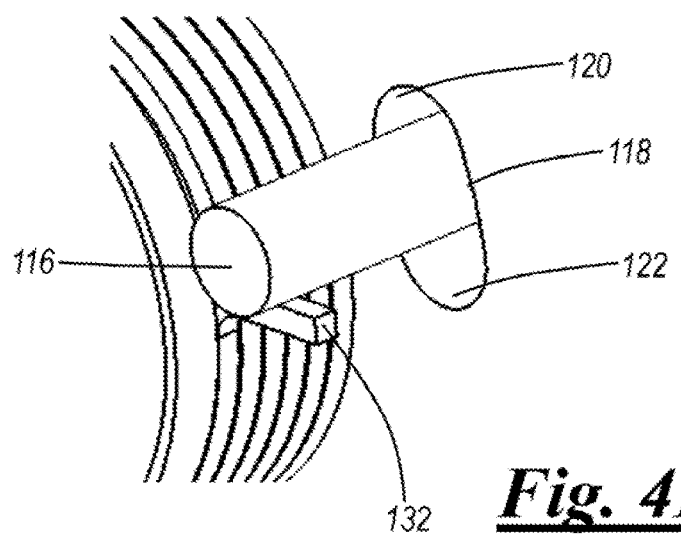
FIG. 4B is a close-up view of a portion of the motor assembly of FIG. 4A.

As perhaps best illustrated in FIGS. 4A and 4B, a first tang 132 of the locking mechanism 124 is bent radially outward from the locking mechanism 124 so that the first tang 132 can be engaged by the pin 116 when the motor 108, rotation plate 110, and pin 116 rotate in a clockwise direction, as will be discussed below.

Figure 5A:
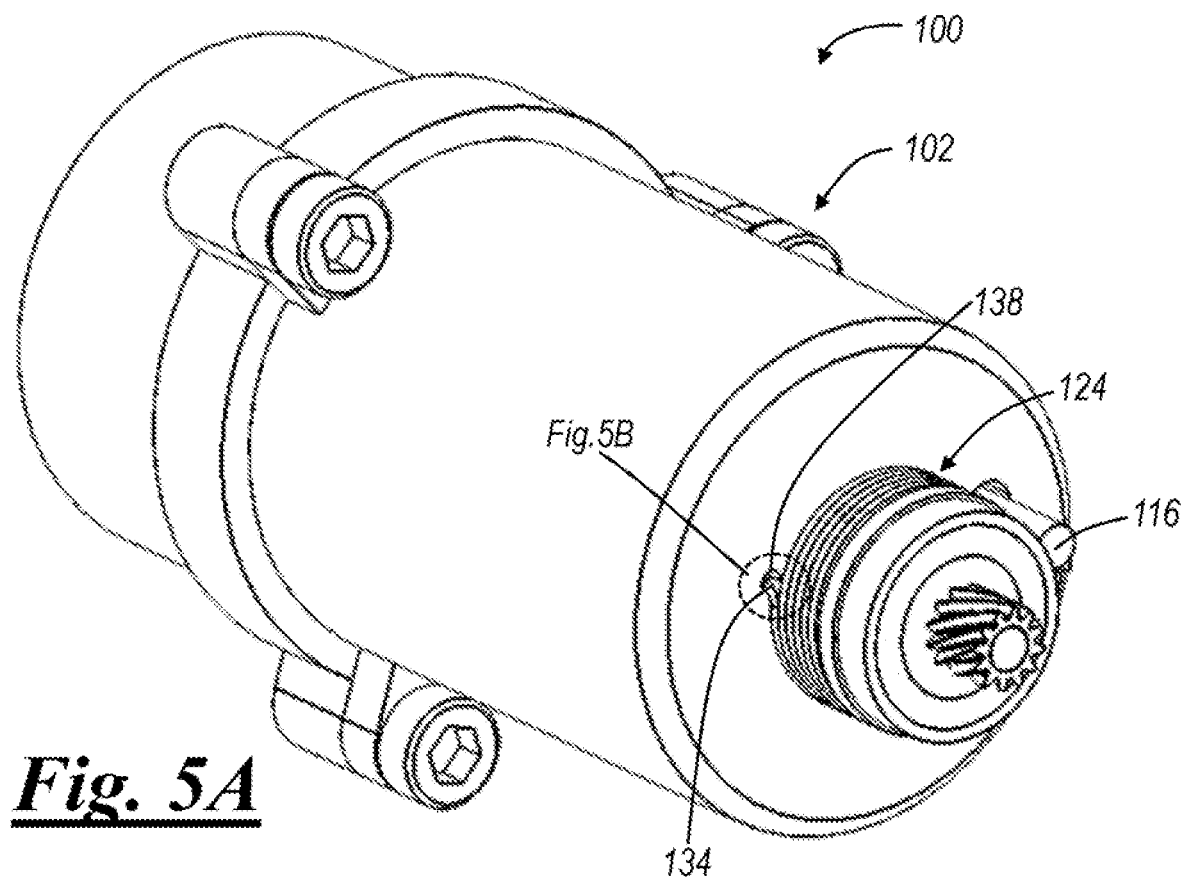
FIG. 5A is a perspective view of the motor assembly of FIG. 4A.
Figure 5B:
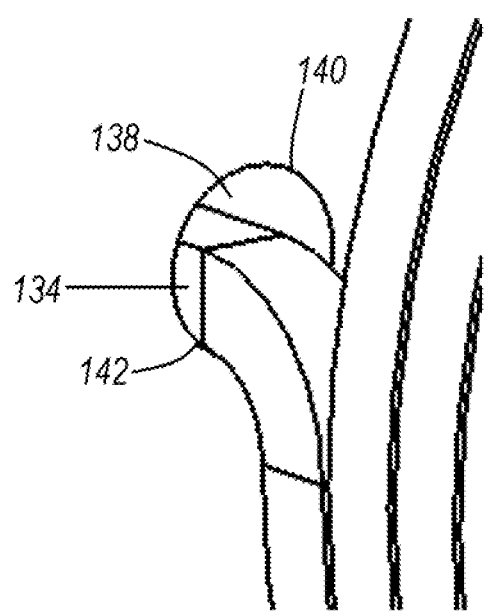
FIG. 5B is a close-up view of a portion of the motor assembly of FIG. 5A.

As perhaps best illustrated in FIGS. 5A and 5B a second tang 134 of the locking mechanism 124 is bent axially and thus parallel to the locking mechanism 124 and motor 108 axis 136 (FIG. 7) so that the second tang 134 extends through an opening 138 defined in the main housing 102. The second tang 134 is loosely received in the opening 138 of the main housing 102 so that the second tang 134 can move or engage opposing sides 140, 142 of the opening 138 as will be discussed further below.

Figure 6:
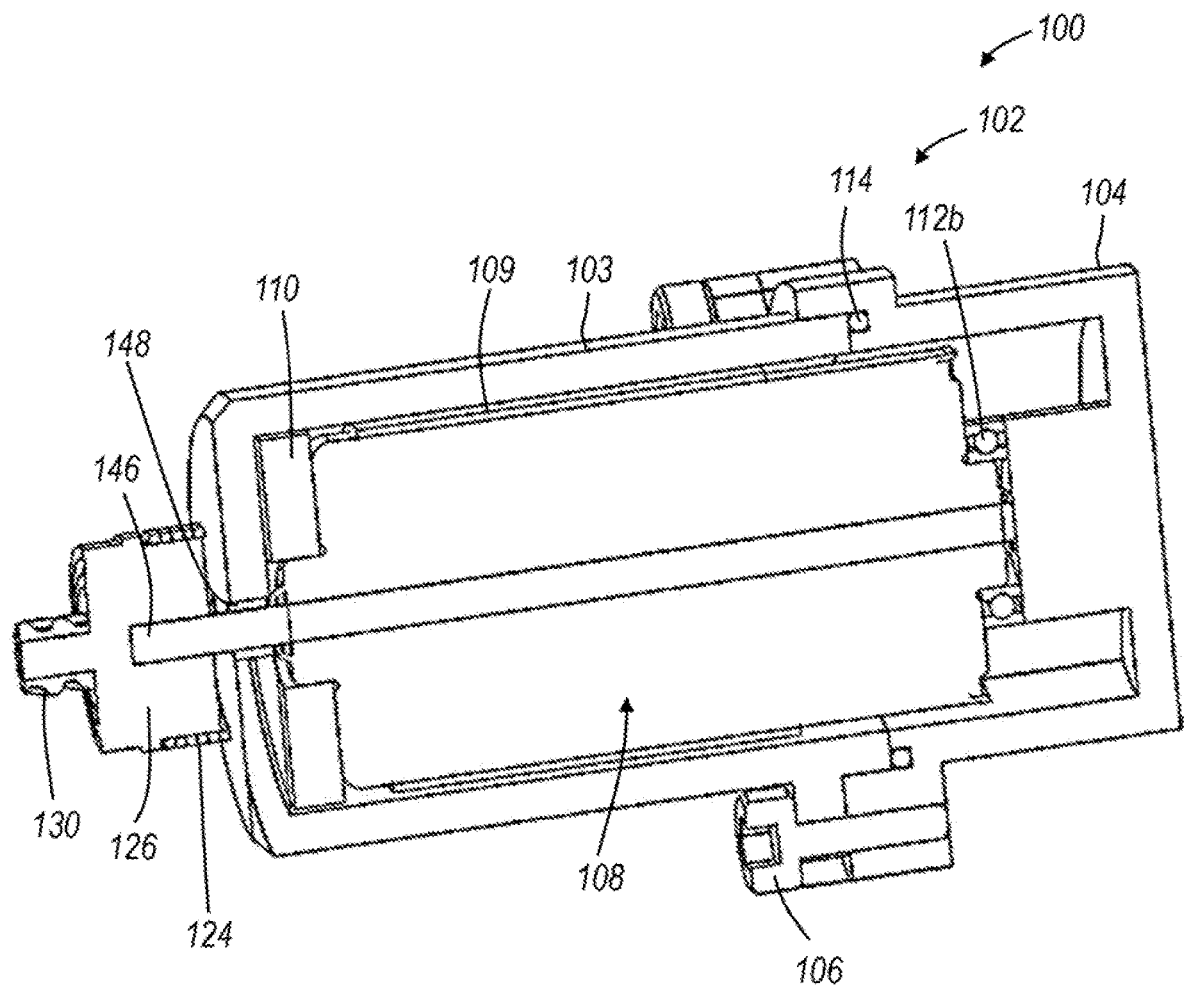
FIG. 6 is a cross-sectional view of the motor assembly of FIG. 4A.
Figure 7:
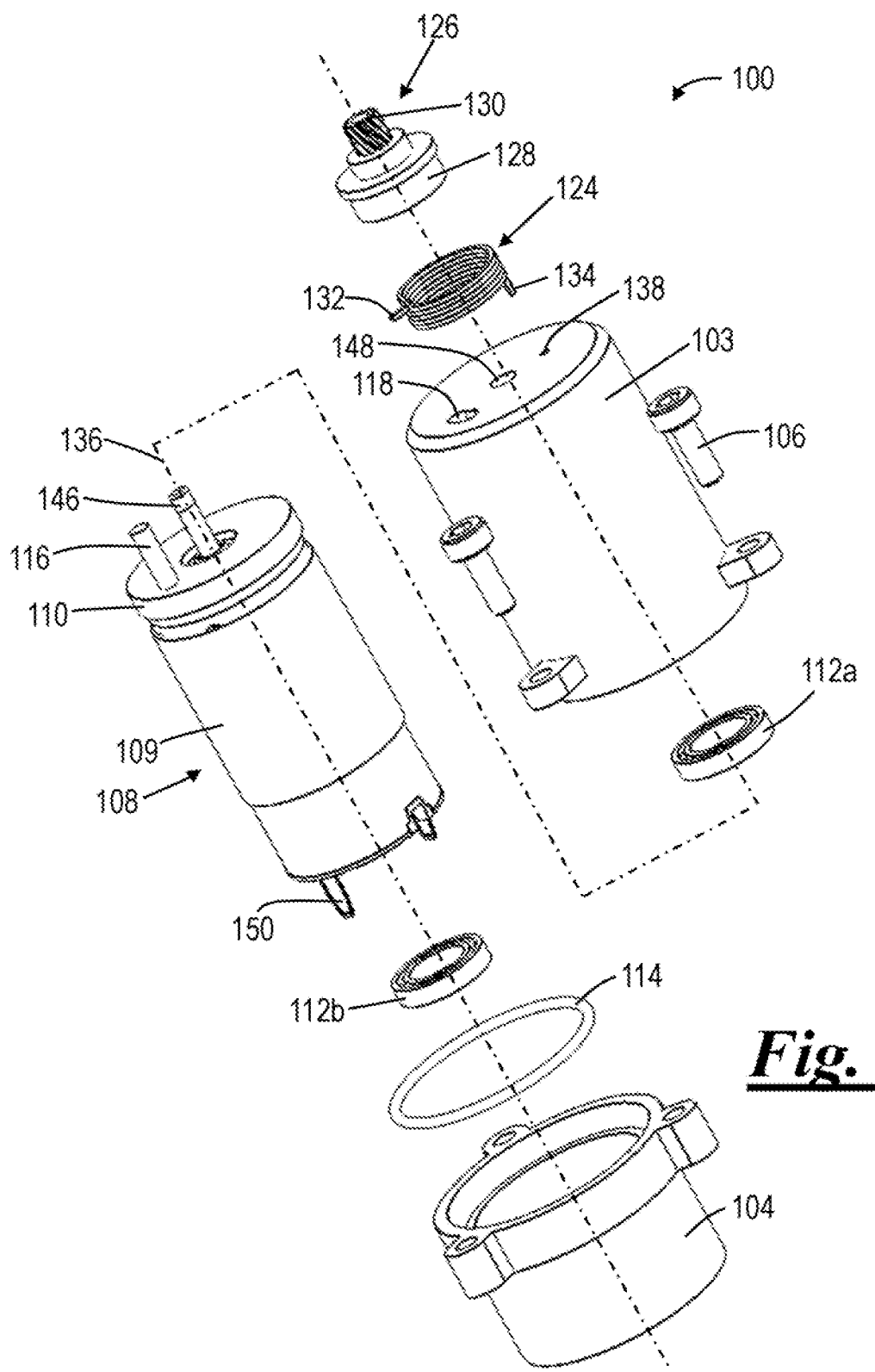
FIG. 7 is an exploded, perspective view of the motor assembly of FIG. 4A.

With specific reference to FIGS. 6 and 7, the motor 108 is received in the main housing 102 such that the output shaft 146 of the motor 108 extends through an opening 148 defined in the main housing 102. The motor gear 126 is attached to the output shaft 146 of the motor 108 so that the motor gear 126 and output 130 rotates with the output shaft 146.

The motor 108 comprises one or more leads or plugs 150 for connecting the motor 108 to a power source or controller for operating the motor 108, for example turning the motor 108 ON and OFF.

The pin 116 is secured to the rotation plate 110, and the rotation plate 110 is secured to the motor housing 109 so that the plate 110 and the pin 116 rotate with the motor housing 109 inside the main housing 102 about the axis 136. Again, the rotation plate 110 can be omitted, and in such a case the pin 116 can be attached or secured directly to the motor housing 109 so that the pin 116 rotates with the motor housing 109 inside the main housing 102. The bearings 112a, 112b support the motor housing 109 so that the motor housing 109 can rotate within the main housing 102 to unlock the locking mechanism 124 as will be discussed below. However, because the pin 116 extends through the slot 118 of the main housing 102, the rotation of the motor housing 109 about the axis 136 is restricted to between the first end 120 and the second end 122 of the slot 118.

Operation of the motor assembly 100 will now be described. The operation of the motor assembly 100 will be described as supplying torque to one of the brake assemblies 10 discussed above. Again, it is understood, that the motor assembly 100 can be used in non-brake related applications or destinations.

Creating clamping force will be described first. The clamping force may be created to slow, stop, or prevent movement of a vehicle (i.e., may be created during or for a standard brake apply, or application of the service brake). The clamping force may be created to maintain a vehicle in a stopped or parked position (i.e., during or for a parking brake apply). To generate torque (i.e., first rotational direction torque), an electrical current or signal is supplied to the one or more leads or plugs 150 to energize the motor 108. The electrical current or signal causes the output shaft 146 of the motor 108 to rotate in a clockwise direction 152, which causes the motor gear 126 to rotate in the clockwise direction 152. As the motor gear 126 is rotated in the clockwise direction 152, the locking mechanism 124 moves such that second tang 134 moves and contacts an edge of the opening 138 in the area of 140 in the main housing 102 (FIG. 5B) so that one end of the locking mechanism 124 is grounded to the main housing 102. As the motor shaft 146 continues to rotate in a clockwise direction 152, clockwise torque is applied on the counter-clockwise wound locking mechanism 124 which is forced to unwind, thus loosening its grip on the arbor diameter 128, and allowing the motor shaft 146 to rotate in the apply direction to generate clamping force. The drag between the locking mechanism 124 and arbor diameter 126 will cause the motor housing 109 and pin 116 to rotate in a counterclockwise direction until the pin 116 contacts the first end 120 of slot 118 in the main housing 102.

With a load acting on the output shaft 146 of the motor 108, the motor housing 109 will rotate in the main housing 102 in a direction opposite the direction of rotation of the output shaft 146 (i.e., in a counter-clockwise direction 154) until the pin 116 contacts the edge 120 of the slot 118 in the main housing 102 (FIG. 48) so that a load is created and/or applied on the motor housing 109.

Because the output shaft 146 and the motor gear 126 are rotated in the clockwise direction 152, which is the same direction that the locking mechanism 124 allows rotation due to its counter-clockwise winding, the motor gear 126 can continue to be rotated in the clockwise direction 152 and thus transfer the first rotational direction torque to one or both of the rotary to linear stage mechanisms 24, 26 or the expansion mechanism 38, which will cause the brake pads or the brake shoes to move against the respective brake rotor or brake drum to create the clamping force.

After the desired clamping force has been created, the motor 108 is turned OFF. When the motor 108 is turned OFF, the generated clamping force will apply an opposing, counter-clockwise torque on the motor gear 126 and output shaft 146. However, because the locking mechanism 124 is wound in a counter-clockwise direction, the locking mechanism 124 will resist the counter-clockwise torque acting on the on the motor gear 126 and output shaft 146 when the second tang 134 of the locking mechanism 124 contacts the other edge of the opening 138 in the area of 142 in the main housing 102 (FIG. 5B). Thus, the opposing reaction torque of the counter-clockwise torque generated by clamping force acting on the motor gear 126 and the output shaft 146 will be resisted by the main housing 102, and a back drive of the motor 108, the brake pistons 20, 22 or shoes 34, 36, and/or the one or more mechanisms 24, 26, 38 will be resisted or prevented via second tang 134. Thus, the clamping force will be maintained when the motor 108 is OFF or when power ceases to be provided to the motor 108.

To generate torque (i.e., a second rotational direction torque), another electrical current or signal is supplied to the one or more leads or plugs 150 to energize the motor 108. Because the output shaft 146 is prevented from rotating in the counter-clockwise direction 154 due to the counter-clockwise winding of the locking mechanism 124, the motor housing 109 will rotate in the clockwise direction 152 until the pin 116 contacts the first tang 132 of locking mechanism 124 (FIG. 4B) and then pushes the first tang 132 of the locking mechanism 124 in the clockwise direction 152 to unwind or loosen the interference fit or grip of the locking mechanism 124 on the arbor diameter 128. The motor housing 109 will rotate in the main housing 102 in the clockwise direction 152 until the pin 1 has loosened the grip of the locking mechanism 124 on the arbor diameter 128.

After the interference fit or grip of the locking mechanism 124 on the arbor diameter 128 is loosened, the output shaft 146 and motor gear 126 can be rotated in the counterclockwise direction 154 and thus transfer the second rotational direction torque to one or both of the rotary to linear stage mechanisms 24, 26 or the expansion mechanism 38, which will cause the brake pads or the brake shoes to relax or move away from the respective brake rotor or brake drum to release the clamping force. Note that the drag created by the arbor diameter 128 rotating with respect to the locking mechanism 124 is balanced by the torque of the motor housing 109 applied to the first tang 132.

Figure 8:
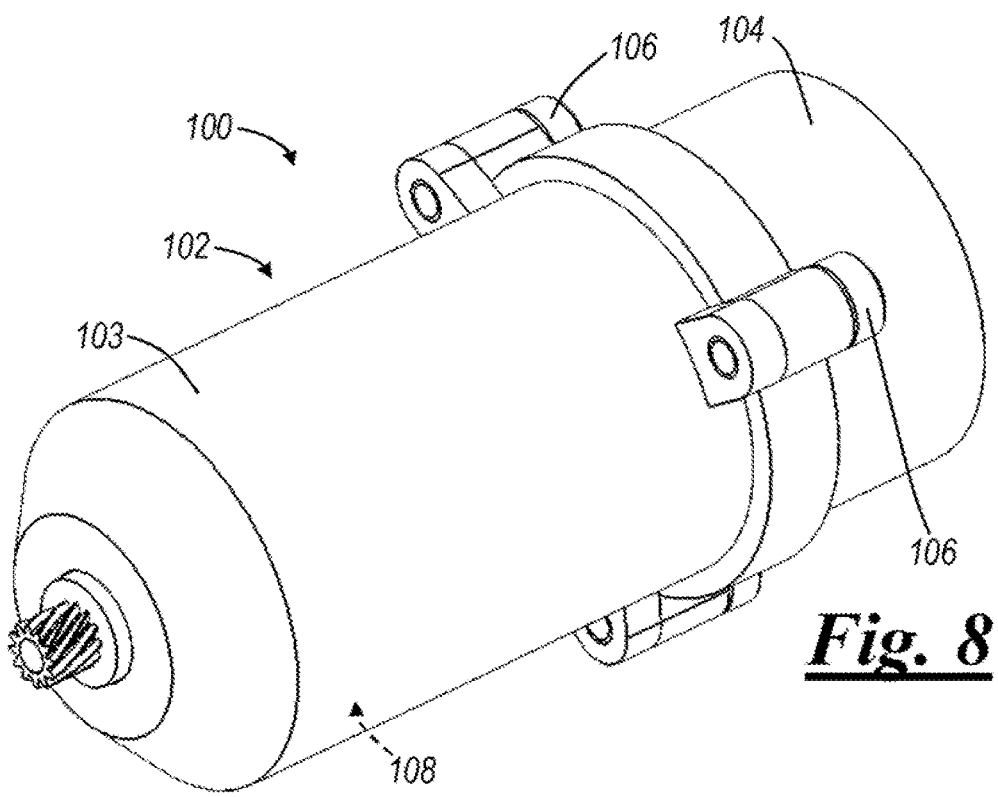
FIG. 8 is a perspective view of another motor assembly.

FIG. 8 illustrates another motor assembly 100. The motor assembly 100 comprises a main housing 102. The main housing 102 includes a main body 103 and a cap 104 that are jointed together by at least one fastener 106. Located inside the main housing 102, the motor assembly 100 comprises a motor 108. The motor assembly 100 of FIG. 8 may be substantially similar to the motor assembly 100 illustrated in FIGS. 1-7; however, as can be seen in FIG. 8, several of elements of the motor assembly 100 are contained within the main housing 102, including the locking mechanism 124 and the pin 116.

Figure 9:
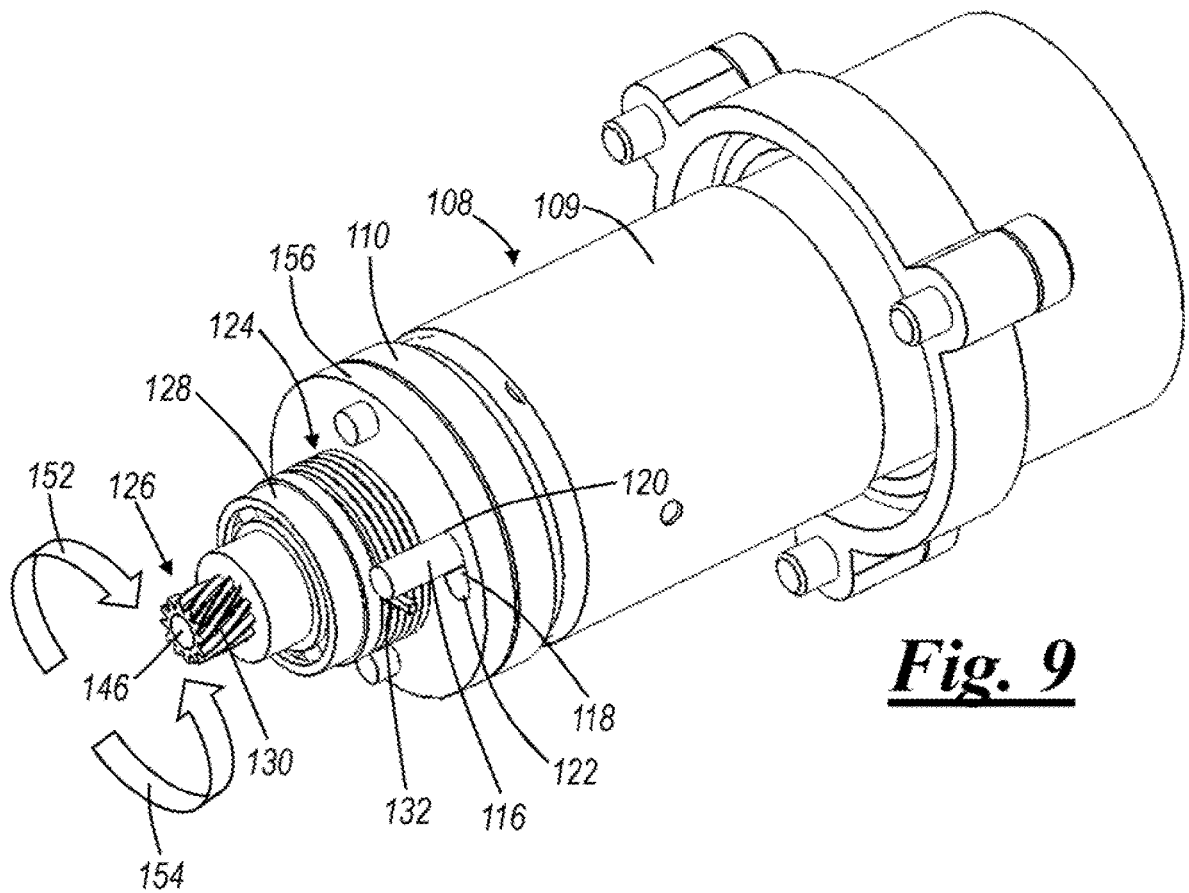
FIG. 9 is a perspective view the motor assembly of FIG. 8 with the main body removed.
Figure 10:
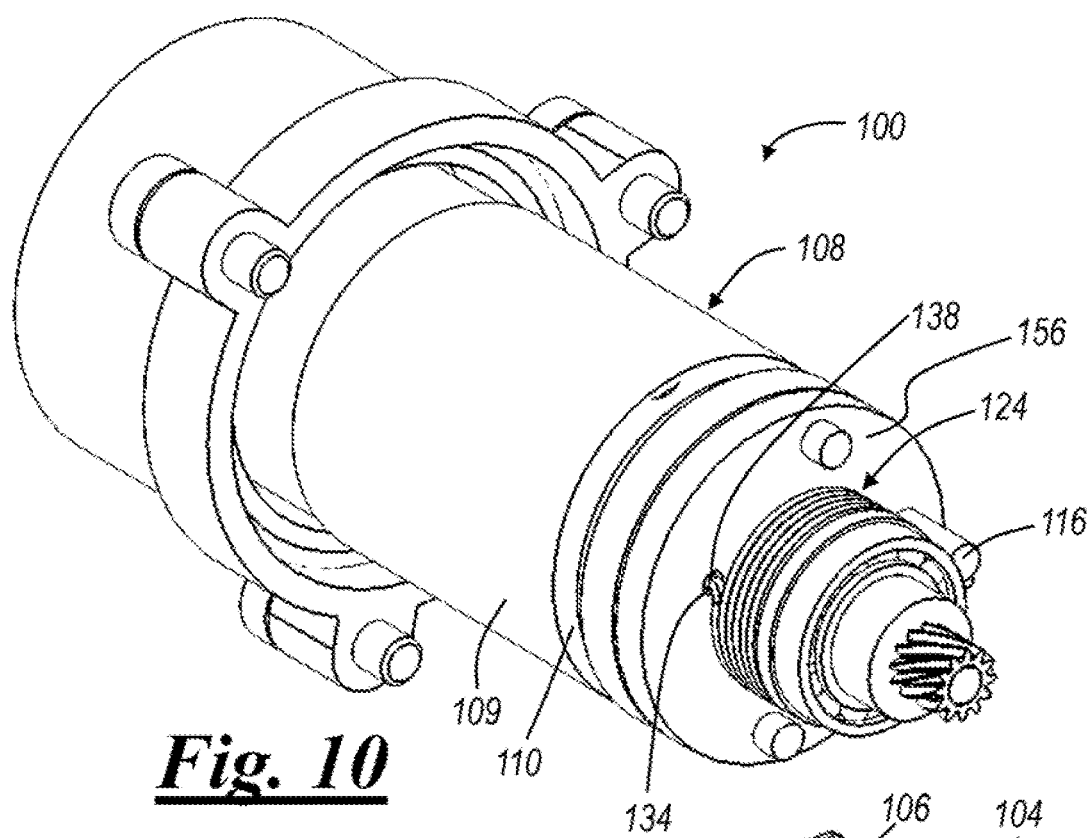
FIG. 10 is a perspective view the motor assembly of FIG. 8 with the main body removed.
Figure 11:
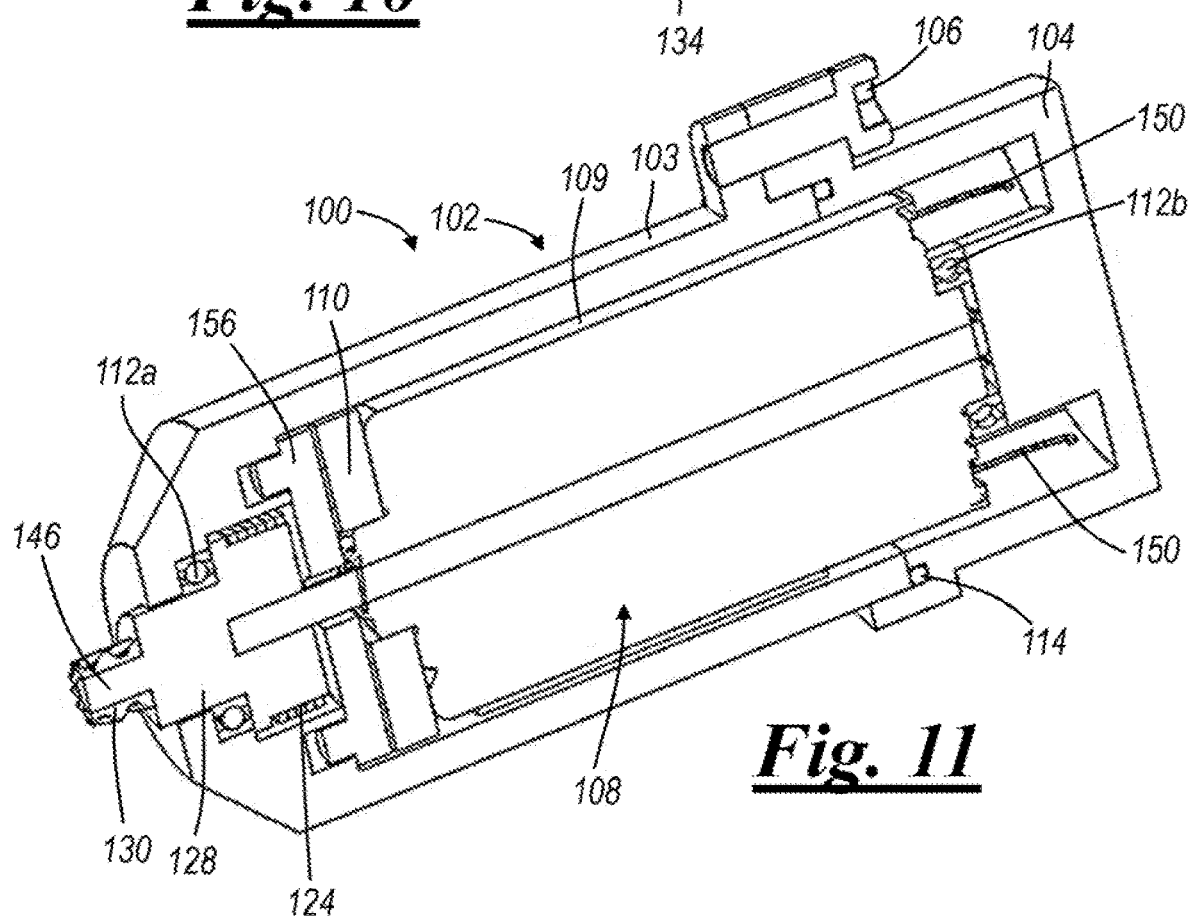
FIG. 11 is a cross-sectional view of the motor assembly of FIG. 8.

FIGS. 9 and 10 illustrate the motor assembly 100 of FIG. 8, but with the main body 103 removed for clarity. The motor assembly 100 includes a motor 108 that is contained in a motor housing 109; a rotation plate 110; a stationary plate 156; and a pair of bearings 112a, 112b (bearing 112b illustrated in FIG. 11). A pin 116 is attached to the rotation plate 110. As was discussed above in FIGS. 1-7, it is understood that the rotation plate 110 in this motor assembly 100 can also be omitted. If the rotation plate 110 is omitted, then the pin 116 can be attached directly to the motor housing 109. However, if the motor assembly 100 includes the rotation plate 110, the rotation plate 100 may be thought of as being identical to, or the same as, the motor housing 109. Whether attached to the motor housing 109 or the rotation plate 110, the pin 116 extends through a slot 118 defined in the stationary plate 156. The stationary plate 156 is secured or fixed to the main housing 103 such that the stationary plate 156 does not rotate or otherwise move.

With continued reference to FIGS. 9 and 10, the pin 116 is secured to the rotation plate 110, and the rotation plate 110 is secured to the motor housing 109 so that the plate 110 and the pin 116 rotate with the motor housing 109 inside the main housing 102 about the axis 136. Again, the rotation plate 110 can be omitted, and in such a case the pin 116 can be attached or secured directly to the motor housing 109 so that the pin 116 rotates with the motor housing 109 inside the main housing 102. The bearings 112a, 112b support the motor housing 109 so that the motor housing 109 can rotate within the main housing 102 to unlock the locking mechanism 124 as was discussed above with reference to FIGS. 1-7. However, because the pin 116 extends through the slot 118 of the stationary plate 156, the rotation of the motor housing 109 about the axis 136 is restricted to between the first end 120 and the second end 122 of the slot 118.

With continued reference to FIGS. 9 and 10, the motor assembly 100 also comprises a locking mechanism 124 and a motor gear 126. Here the locking mechanism 124 is a wrap spring. The motor gear 126 is in communication with an output shaft 146 of the motor 108 so that rotation of the output shaft 146 causes the motor gear 126 to also rotate. The motor gear 126 comprises an arbor diameter 128 and an output 130. The locking mechanism 124 surrounds and grips a portion of the arbor diameter 128 with a slight interference fit. The locking mechanism 124 is wrapped or wound in a counter-clockwise direction, which means that the locking mechanism 124 will resist counter-clockwise rotation of the outputs 130, 146, but allow clockwise rotation of the outputs 130, 146. Torque generated by the motor assembly 100 is transferred or supplied to one or both of the rotary to linear stage mechanisms 24, 26 or the expansion mechanism 38 of the brake assemblies 10 described above via the output 130 of the motor gear 126 to create or release the clamping force.

FIG. 9 illustrates a first tang 132 of the locking mechanism 124 that is bent radially outward from the locking mechanism 124 so that the first tang 132 can be engaged by the pin 116 when the motor 108, rotation plate 110, and pin 116 rotate in a clockwise direction, as was discussed above with reference to FIGS. 1-7.

FIG. 10 illustrates a second tang 134 of the locking mechanism 124 that is bent axially and thus parallel to the locking mechanism 124 and motor 108 axis 136 (FIG. 7) so that the second tang 134 extends through an opening 138 defined in the stationary plate 156. The second tang 134 is loosely received in the opening 138 of the main housing 102 so that the second tang 134 can move or engage opposing sides 140, 142 of the opening 138 as will be discussed above in referring to FIG. 5B.

The motor 108 comprises one or more leads or plugs 150 for connecting the motor 108 to a power source or controller for operating the motor 108, for example turning the motor 108 ON and OFF.

The operation of the motor assembly 100 including the operation of the locking mechanism 124 of FIGS. 8-11 may be the same as was described above with reference to FIGS. 1-7, so in the interest of brevity, it will not be described again.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or one to describe, an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including, patent applications and publications, are incorporated by reference for all purposes. Other combinations are also possible as will be gleaned from the following claims, which are also hereby incorporated by reference into this written description.

The invention claimed is:

1. An assembly comprising:
a) a main housing;
b) a motor contained in a motor housing and supported within the main housing, the motor comprising an output shaft; and
c) a wrap spring locking mechanism comprising a first tang adapted to engage a pin that extends through a slot defined in the main housing;
wherein the motor is adapted to generate and transfer a first rotational direction torque and an opposing second rotational direction torque to a destination via the output shaft;
wherein the wrap spring locking mechanism is adapted to prevent the output shaft from back driving in the second rotational direction after the first rotational direction torque has been transferred to the destination; and
wherein the pin is in communication with the motor housing, the pin is configured to rotate with the motor housing when the motor housing rotates within the main housing, and the pin is configured to engage and then move the first tang of the wrap spring locking mechanism to unlock the wrap spring locking mechanism when the motor housing rotates within the main housing so that the second rotational direction torque can be transferred to the destination.

2. The assembly according to claim 1, wherein the motor housing is adapted to rotate in the main housing independently of the rotation of the output shaft to unlock the wrap spring locking mechanism.

3. The assembly according to claim 1, wherein the pin extends through a slot defined in a stationary plate that is fixed to the main housing.

4. The assembly according to claim 3, wherein a length of the slot is defined between a first end and a second end, and rotation of the motor housing in the main housing is restricted to between the ends of the slot.

5. The assembly according to claim 1, wherein the wrap spring locking mechanism is located outside of the main housing.

6. The assembly according to claim 1, wherein the wrap spring locking mechanism is located inside the main housing.

7. A brake assembly comprising:
a) a brake system; and
b) a motor assembly in communication with the brake system, the motor assembly comprising:
i) a motor contained in a motor housing;
ii) a main housing supporting the motor housing;
iii) an output shaft; and
iv) a wrap spring locking mechanism comprising a first tang adapted to engage a pin that extends through a slot defined in the main housing, wherein the pin is configured to rotate with the motor housing;
wherein the motor is adapted to generate a first rotational direction torque and a second rotational direction torque, the motor is adapted to transfer the first rotational direction torque to a destination via the output shaft to create a clamping force, and the motor is adapted to transfer the second rotational direction torque to the destination via the output shaft to release the clamping force;
wherein the wrap spring locking mechanism is adapted to prevent the output shaft from back driving in the second rotational direction after the clamping force has been created;
wherein the motor housing is adapted to rotate in the main housing to unlock the wrap spring locking mechanism to allow the motor to transfer the second rotational direction torque to the destination to release the clamping force; and
wherein the pin engages and moves the first tang to unlock the wrap spring locking mechanism when the motor housing rotates in the main housing.

8. The brake assembly according to claim 7, wherein the brake system includes one or more brake pistons.

9. The brake assembly according to claim 7, wherein the brake system includes two brake pistons.

10. The brake assembly according to claim 7, wherein the output shaft is in communication with one or more rotary to linear stage mechanisms,
wherein the first rotational direction torque is adapted to move the one or more rotary to linear stage mechanisms in a first direction so that a brake piston moves an inboard brake pad against a brake rotor to create the clamping force, and
wherein the second rotational direction torque is adapted to move the one or more rotary to linear stage mechanisms in a second direction so that the brake piston moves away from the inboard brake pad to release the clamping force.

11. The brake assembly according to claim 7, wherein the output shaft is in communication with an expanding mechanism, and
wherein the first rotational direction torque is adapted to move the expanding mechanism in a first direction so that one or more brake shoes are moved against a brake drum to create the clamping force, and
wherein the second rotational direction torque is adapted to move the expanding mechanism in a second direction so that the one or more brake shoes are moved away from the brake drum to release the clamping force.

12. The brake assembly according to claim 7, wherein the wrap spring locking mechanism has a second tang that is configured to engage an opening in the main housing.

13. The brake assembly according to claim 7, wherein the motor assembly comprises a motor output having an arbor diameter; and wherein the wrap spring locking mechanism is wrapped around the arbor diameter.

14. The brake assembly according to claim 7, wherein the rotation of the motor housing in the main housing is restricted to between opposing ends of the slot.

15. The brake assembly according to claim 7, wherein slot is defined in a stationary plate in the main housing.

16. The brake assembly according to claim 15, wherein the wrap spring locking mechanism has a second tang that is configured to engage an opening in the stationary plate.

17. The brake assembly according to claim 15, wherein the rotation of the motor housing in the main housing is restricted to between opposing ends of the slot.

* * * * *

UNITED STATES PATENT AND TRADEMARK OFFICE
CERTIFICATE OF CORRECTION

PATENT NO. : 10,903,715 B2  
APPLICATION NO. : 15/909031  
DATED : January 26, 2021  
INVENTOR(S) : Galus Chelaidite et al.

It is certified that error appears in the above-identified patent and that said Letters Patent is hereby corrected as shown below:

In the Claims

Column 15, Lines 7 and 8, Claim 15: insert --the-- after "wherein" and before "slot is defined"

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*